United States Patent
Yee et al.

(10) Patent No.: US 6,380,924 B1
(45) Date of Patent: Apr. 30, 2002

(54) MOUSE/KEYBOARD CAPTURE RECORDER (MCR) APPARATUS AND METHODOLOGY

(75) Inventors: Young Yee, 3903 Azalea Dr., Las Cruces, NM (US) 88005; Raul Gonzalez, El Paso, TX (US)

(73) Assignee: Young Yee, Las Cruces, MN (US)

( * ) Notice: Subject to any disclaimer, the term of this patent is extended or adjusted under 35 U.S.C. 154(b) by 0 days.

(21) Appl. No.: 09/416,546

(22) Filed: Oct. 12, 1999

Related U.S. Application Data

(60) Provisional application No. 60/105,200, filed on Oct. 22, 1998.

(51) Int. Cl.[7] ................................................ G09G 5/00
(52) U.S. Cl. ...................... 345/156; 345/163; 345/168; 710/67; 708/146; 235/146
(58) Field of Search ................................ 345/156–169, 345/333; 463/37–38; 710/67, 65; 708/142; 235/145 A, 145 R, 146; 341/22, 23

(56) References Cited

U.S. PATENT DOCUMENTS

| | | | | |
|---|---|---|---|---|
| 4,964,075 A | * | 10/1990 | Shaver et al. | 235/146 |
| 5,402,518 A | * | 3/1995 | Lowery | 704/201 |
| 6,018,335 A | * | 1/2000 | Onley et al. | 345/172 |
| 6,088,712 A | * | 7/2000 | Huang et al. | 707/526 |

* cited by examiner

*Primary Examiner*—Lun-Yi Lao
(74) *Attorney, Agent, or Firm*—Gunn, Lee & Hanor, P.C.; Michelle Evans

(57) ABSTRACT

This apparatus is an add-on computer component peripheral for existing computer systems. The mouse/keyboard capture recorder (MCR) is capable of recording keyboard keystrokes, mouse coordinate movements, and mouse actions such as left, middle and right mouse clicks and/or mouse drag movements. The MCR has external cables that connect inline to a host computer's external keyboard and mouse without modification on the host computer system and its peripherals. The MCR apparatus operates independently of the hardware and software that is installed on a host computer system. A microprocessor monitors and controls all operations and stores mouse actions and keyboard actions in non-volatile memory during the MCR's record mode. In the MCR play mode, the apparatus will transmit the stored keyboard/mouse data by sending electrical signals representing the stored data to a host computer system via the mouse port and the keyboard port. The apparatus may be installed permanently or temporarily in the keyboard and mouse line without taking any precautions to save the recorded commands or actions when the computer is powered down or when the apparatus is removed from the user's computer system. The apparatus is compatible with all computers that utilize external mouse devices and/or external keyboards and is transparent to the user in that the computer system will operate the same with or without the apparatus attached. It is compatible with all computer programs and needs no support software or additional circuit boards installed in the (main) computer system to operate.

4 Claims, 6 Drawing Sheets

MOUSE/KEYBOARD CAPTURE RECORDER (MCR) APPARATUS AND METHODOLOGY

This application claims the benefit of U.S. Provisional Application No. 60/105,200, filed Oct. 22, 1998.

BACKGROUND OF THE INVENTION

1. Field of The Invention

Applicant's invention relates to a mouse and keyboard recording and/or reproducing apparatus that is capable of recording mouse actions and keyboard keystrokes. Such mouse actions can include mouse movements, mouse drags, and mouse button clicks. The apparatus is capable of playing back recorded mouse actions and keyboard keystrokes in the proper sequence. Again, such mouse actions can include mouse movements, mouse drags, and mouse button clicks. In addition, this invention relates to computer peripheral devices that store mouse and keyboard actions for future execution.

2. Background Information

The mouse invented by Douglas Engelbart of Stanford Research Center in 1963 is one of the great breakthroughs in computer ergonomics because it frees the user to a large extent from using the keyboard. In particular, the mouse is important for graphical user interfaces because you can simply point to options and objects and click a mouse button. Unfortunately, certain applications have become so complex that extensive training must be taken before becoming proficient in these programs. Many applications are point-and-click programs that require careful positioning of the pointer and some amount of skill. Computer technology has advanced so rapidly in recent years that people are often overwhelmed when using the computer and more sophisticated software programs. For novice users, this can become a very frustrating task. Although the expert user can easily utilize the powerful features of a windows-based application, the novice can just as easily get himself/herself into difficulties very quickly. Training is a very costly as well as tedious and time consuming process and unfortunately for the novice, different versions of the same applications must be learned which adds to the confusion. Errors in windows-based applications can be very costly especially in the business office environment. Because of the likelihood of serious errors as well as intimidation, many computer users never fully master the powerful capabilities of the personal computer or the mainframe computer. The MCR simplifies complex application maneuvers and makes computers more like operating a single dedicated machine with push buttons.

There is a need for devices in which complex computer operations can be simplified with a push of a button and in which the general public has experience operating. Most people have had exposure to the recording and playing of video tapes via a video cassette recorder (VCR) device. The MCR can be thought of as being similar to a VCR except that instead of video recordings applicants are storing mouse and keyboard actions and then replaying them. The control buttons are analogous to the play, record, pause, stop and rewind features of a VCR.

Many application programs have a facility for recording keystrokes made by a user in interacting with the particular application program. These keystrokes, stored in a macro file, may be later played back. This use of playback using a macro can allow a user to simply re-execute a complicated set of commands. Additionally, the user can run an often repeated task by running a single macro. These macros are software application dependent in that the software application must be running at least in background in order to be launched and be in standby mode.

Microsoft had a recorder tool in the early Microsoft Windows 3.1 version which allows the user to record mouse movements relative to the screen or to the application. This particular software applied only to Microsoft Windows compatible programs and therefore was software dependent. To begin the recording, the user had to run a macro window application and learn how to define the macro, start and stop the macro without interfering with the actual recording itself. For example, to stop the macro, the user could press a key combination but then the user would have to make sure that the recording itself did not contain that particular key combination. The recorder tool is not offered in Microsoft Windows 95. Since the Microsoft recorder is a software application in itself on the host computer, it is both software and hardware dependent. In addition, setting up the macros requires training.

DEFINITIONS

Certain terms shall be used throughout this disclosure and are given the following definitions:

COMPUTER WORKSTATION is typically a multi-user computer system in which many users can run their own separate applications on the same workstation.

KEYBOARD COMMAND is a sequence of specific keystrokes that a computer user must enter at the keyboard in order to initiate an operation in, or elicit a specific response from the computer system.

HARDWARE INDEPENDENCE. When an ancillary machine is capable of performing its required tasks, regardless of the characteristics of the equipment to which it is connected, it is known as possessing HARDWARE INDEPENDENCE.

HOST COMPUTER SYSTEM. A computer system in which the MCR apparatus would be connected. The MCR operates as a peripheral device to a host computer system.

MCR. Mouse/keyboard Capture Recorder apparatus which is the name and subject of this invention.

MASS STORAGE. Refers to various techniques and devices for storing large amounts of data. Mass storage devices include floppy disks, hard disk drive, optical disks, zip type cartridges and tapes.

MEMORY. Internal storage areas in the computer. Identifies data storage that comes in the form of chips.

MACRO is defined as a keystroke function which represents or emulates a keyboard keystroke set or data set and is used to replace certain keyboard keystroke or data sets.

MOUSE. A device that controls the movement of the cursor or pointer on a display screen. A mouse contains at least one button and sometimes as many as three, which have different functions depending on what program is running. Examples of different types of mouse are serial mouse, PS/2 compatible mouse, mousepad, bus mouse, button mouse on laptops, and trackball mouse.

MEMORY-RESIDENT PROGRAMS. At times when a computer does not have enough memory to hold all the programs a user uses, the operating system may free some memory by copying data or programs from main memory to a disk. However, certain programs can be marked as being memory resident, which means that the operating system is not permitted to swap them out to a storage device; they will always remain in memory when the computer is on. Another name for memory-resident programs is TERMINATE AND STAY RESIDENT (TSR) programs.

MICROPROCESSOR. A silicon chip that contains a CPU (Central Processing Unit).

MACHINE DEPENDENT. Refers to a software application that runs only on a particular model of computer. Programs that run on a variety of computers are called machine independent.

NON-VOLATILE MEMORY is memory means which relates its internally stored data when all external electrical power is removed. The internally stored data becomes available for normal use when the external electrical power is restored.

PLAYING. In this invention's context, playing is the mode of the MCR apparatus in which electrical signals representing stored mouse actions and keyboard actions are transmitted from the MCR to a host computer system analogous to playing a tape.

RECORDING. In this invention's context, recording is the mode of the MCR apparatus in which electrical signals from a mouse and/or keyboard are being stored by the MCR apparatus analogous to a tape recording.

PC. PC's are families of computers that were developed by IBM in the early 1980's. Starting from the early XT computers to the modern day Pentium computers. In our references to the PC (Personal Computer), we are also referring to all types of personal computers that make use of keyboard and/or mouse devices including Apple computers and all their clones.

PORT. An interface on a computer to which a user can connect devices such as a mouse, a keyboard, disk drives, modems, and the like.

PORTABLE. When used to describe hardware, portable means small and lightweight.

PS/2. IBM mouse and keyboard interface standard.

SIMILARITY AND FAMILY. Computers are generally described as finite-state automata or, simply "machines". Two or more separate machines are defined as being SIMILAR if they employ the same mouse/keyboard protocol, and the same mouse/keyboard codes. However, if these machines employ the same protocol but have different mouse/keyboard codes, they are said to be dissimilar but within the same FAMILY (of machines).

SOFTWARE INDEPENDENCE is the ability of an ancillary machine to perform a desired task, regardless of the operating system software or applications software being used in the host computer, and without the need to install any additional software in the computer system.

TRANSPARENCY. An ancillary machine or device is TRANSPARENT to the operation of a computer system if it can be installed and used on the computer system without requiring any additional installation or modification of computer software, and if the computer can be operated normally in all modes of operation should the user choose to ignore the presence of the ancillary device.

TSR. Terminate and Stay Resident programs are programs that are running or resident in background to be called immediately by the user.

UART. Universal Asynchronous Receiver-Transmitter is a computer component that handles asynchronous serial communication.

USB. Universal Serial Bus standard that allows up to 127 devices to be connected in one serial line.

UNIX. A multitasking operating system developed at Bell Labs in the early 1970's.

The present invention relates to the recording and playback of keystrokes as well as mouse actions. Such mouse actions can include mouse movements, mouse drags, and mouse button clicks. Previous software programs have used preprinted keyboard keycaps or keyboard overlays (templates) onto the user's computer keyboard. In this case, the software program recognizes the specialized keystrokes and launches its application. Unfortunately, these applications are highly computer system dependent as well as software application dependent. The software must be written for specific computer operating systems such as Windows 95, Macintosh, and different versions of Unix operating systems.

Some Unix based systems have history log files that store UNIX type line commands in a reserved file to review in case of computer failure. Again these techniques are dependent on the hardware and software installed in these systems.

Previous methods for recording and replaying keystroke commands have been instigated on the host computer system via TSR programs or within a specific software application. Although storing keystrokes in macro files for playback is a useful practice, it is inadequate in many respects. For example, current schemes for storing keystrokes in macro files are application dependent. They are implemented by a particular application which has its own interface tools. Furthermore, such schemes operate syntactically, requiring a user to understand the syntax of a particular application in order to create a macro file which will operate correctly on that application.

This invention does not require syntactical understanding of any software application in that it is not dependent on the software itself rather it is merely recording the actions of the user at the basic level of entry via keyboard, mouse, trackball and the like.

The MCR paradigm is different than that of macro commands. In the macro paradigm, the user is utilizing the software on the host computer and the user must have knowledge of the application program. But in the MCR paradigm, the MCR acts like a virtual mouse and keyboard and will mimic exactly the user's keyboard and mouse actions. This is accomplished through the basic electrical signals transmitted by these devices. For example, in a word processor application, a user may have to learn the operating system of the host computer to logon and enter the correct directory to open a document file. The user needs to know the application program to open the file and save the data. In the MCR environment, one can record all the keystrokes and mouse actions needed to take the user to the data entry point of any application.

In addition, macros are available on many software applications, but are specific to that application and can not be run outside of that application. They are somewhat difficult to use in that one has to invoke the macro software, name the macro, define and remember hot keys (optional), and then run it. Many of these macros do not record mouse actions. Furthermore, many macro recorders are meant to be hot keys. Macros, in these cases, play too fast thus causing errant behavior when certain applications take too long to execute. The MCR seeks to alleviate the difficulties associated with macro use by providing system and software independence with ease of execution.

Detached keypads are available to supplement the standard keyboard and permits easy data entry but they are not recorder/player-like apparatus. Programmable macro keypads that can be attached to existing keyboards are available but can not record mouse movements or mouse actions. These keypads are limited in memory capability to record keystrokes but mouse recordings would require sufficiently more memory than keystrokes. The MCR provides the necessary recording capabilities.

In addition to its hardware and software independence and ease of execution, the MCR has great utility in that it may be also applied as a user pre-programmed replacement for a conventional mouse/keyboard application where only a predetermined, fixed set of commands are to be repeated on a daily basis. For example, in repetitive data acquisition operations, in machine tool applications, or in robotic control applications, the user may have access only to the MCR controls to prevent naive users from altering the internal program configuration or getting lost in a complex application.

Another advantage of the MCR is that a knowledgeable user in a particular application can setup the application so that a novice user will be able to get into a data entry mode, enter his/her data, save his/her work, and then exit the application with little knowledge of even a complex application.

The MCR can be used as a monitoring device in a monitoring mode to capture a computer user's entries to a computer system. The entries can be stored in a mass storage device for future retrieval of the user's activities. The mass storage media can be removable. This can be useful for security applications.

The MCR can be used for handicap people in which positioning of the mouse and clicking on an icon needs to be completed before specialized computer programs for handicap devices are operational. So effectively, the person could begin the programs with the press of a button.

In manufacturing processes, the MCR can be used to automate repetitive actions on a computer system such as bootup, initialization, login entries, initial input parameters, and the like before a manufacturing device can be functional.

The MCR can be used for training purposes and demonstration of a company's product thus salespersons do not necessarily need to know how to run a complex computer application. It can also be used for trade show demonstrations in which a salesperson or user can be able to push a button and initiate a demonstration and even stop the demonstration for explanations before continuing.

In production applications, the MCR can be isolated from the host computer system unit such that a user will not have access to the mouse and keyboard and therefore cannot alter computer programs or view proprietary information on the host computer thereby guarantying security. In other words, the user would not know how or what the interface is between the computer and the production machine thereby guarding proprietary processes. The MCR can be used in clandestine mode which facilitates security as well by staying hidden from the user. In such a mode, after a user completes his/her daily tasks, the MCR can be used to retrace the actions of the user to determine if the user is performing unauthorized transactions.

SUMMARY OF THE INVENTION

It is an object of the present invention to provide a novel mouse/keyboard capture device for recording and playing user actions.

It is a further object of the present invention to provide a novel mouse/keyboard capture device for recording and playing user actions which is software independent.

Another object of the present invention is to provide a novel mouse/keyboard capture device for recording and playing user actions which is capable of playing stored mouse and keyboard actions.

Yet another object of the present invention is to provide a novel mouse/keyboard capture device for recording and playing user actions which is independent of the user's level of computer skill or knowledge.

It is still an object of the present invention to provide a novel mouse/keyboard capture device for recording and playing user actions which simplifies complex computer application maneuvers.

Another object of the present invention is to provide a novel mouse/keyboard capture device for recording and playing user actions which is hardware independent.

Still another object of the present invention is to provide a novel mouse/keyboard capture device for recording and playing user actions which mimics user actions.

Yet another object of the present invention is to provide a novel mouse/keyboard capture device for recording and playing user actions which can operate outside a given application.

It is still an object of the present invention to provide a method for recording and playing user actions.

It is another object of the present invention to provide a method for recording and playing user actions which is software independent.

It is still an object of the present invention to provide a method for recording and playing user actions which is capable of playing stored mouse and keyboard actions.

Yet another object of the present invention is to provide a method for recording and playing user actions which is independent of the user's level of computer skills and knowledge.

Another object of the present invention is to provide a method for recording and playing user actions which simplifies complex computer application maneuvers.

Still an object of the present invention is to provide a method for recording and playing user actions which is hardware independent.

It is still an object of the present invention to provide a method for recording and playing user actions which mimics user actions.

And another object of the present invention is to provide a method for recording and playing user actions which can operate outside a given application.

In satisfaction of these and related objectives, Applicant's present invention provides for a mouse and keyboard recording and/or reproducing apparatus which is capable of recording both mouse movements/actions and keyboard keystrokes and playing back those recorded actions. The present invention also provides for the methodology for recording and playing back as well.

DETAILED DESCRIPTION OF THE PREFERRED EMBODIMENT

Figure 1:
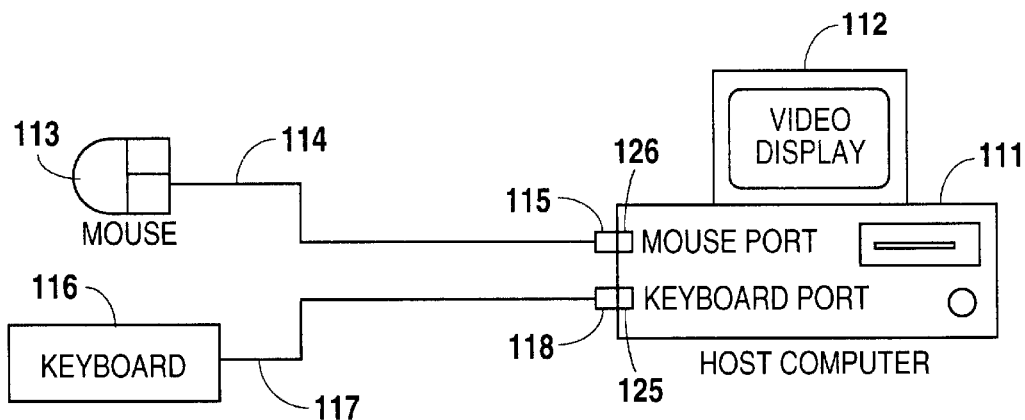
FIG. 1 is a block diagram of a typical computer installation.

FIG. 1 shows a typical computer installation consisting of keyboard 116, mouse 113, video display unit 112 and host computer system unit 111. The figure also depicts a keyboard cable 117 connecting the keyboard 116 to the keyboard port 125 on the host computer system unit 111 by way of the keyboard cable connector 118. The mouse cable 114 is typically connected to the mouse port 126 on the host computer system unit 111, by way of the mouse connector 115. The host computer system unit 111 is not limited to any particular system and may include not only IBM compatible computers but Apple computers as well.

Figure 2:
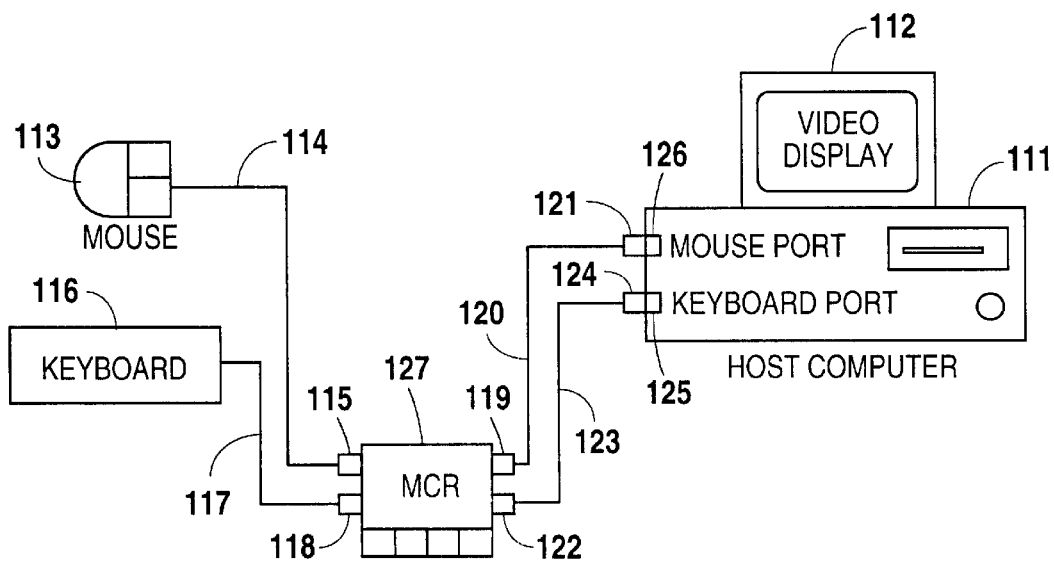
FIG. 2 is a block diagram of the method of installation of the Mouse/keyboard Capture Recorder.

FIG. 2 illustrates the method of installation of the Mouse/keyboard Capture Recorder (MCR) 127. The keyboard 116 connects to the keyboard cable connector 118 by way of the keyboard cable 117. The keyboard cable connector 118 connects into the MCR 127. The mouse cable 114 from the mouse 113 by way of the mouse connector 115 connects into the MCR 127. The MCR's output keyboard port 122 connects to the host computer system unit's keyboard port 125 via a first extension cable 123 and first connector 124. The MCR's output mouse port 119 connects to the host computer system unit's mouse port 126 via a second extension cable 120 and second connector 121. The MCR 127 can be compatible with serial type mouse devices i.e. serial connectors and serial input/output pin configurations. It can also be compatible with PS/2 type mouse and keyboard devices as well as Universal Serial Bus (USB) standard i.e. USB connectors and protocol.

In the STOP 107 (See FIG. 3) and RECORD 108 (See FIG. 3) mode, the mouse 113 and keyboard 116 operate as if there is no intermediate device i.e. the mouse 113 and keyboard 116 signals pass through the MCR 127 unhampered. The video display 112 is illustrated. The host computer system unit 111 is not limited to any particular system and may include not only IBM-compatible computers but Apple computers as well. Although obvious configuration of the electrical connectors would be required depending on the system utilized. Furthermore, in the present embodiment, the MCR 127 may be installed directly inside the host computer system unit 111.

The MCR 127 can be mounted as an integral part of the host computer system unit 111 so that the user will not have to connect any of the external cables, such as the first extension cable 123 and second extension cable 120. In this configuration, the first extension cable 123 and the second extension cable 120 from the MCR 127 to the host computer system unit's 111 keyboard port 125 and mouse port 126 respectively, would be already connected to the MCR 127 inside the host computer system unit 111, but the mouse connector 115 and keyboard connector 118 would be attached to the host computer system unit 111. Then the MCR user controls could be directly mounted on the host computer system unit 111.

For security monitoring, the MCR 127 would be completely inside the host computer system unit 111 inline with the mouse cable 114 and keyboard cable 117. Thus, the MCR 127 could be completely hidden from any users and the user would not be able to determine if the MCR 127 is recording unless the user opens the host computer system unit 111.

Figure 3:
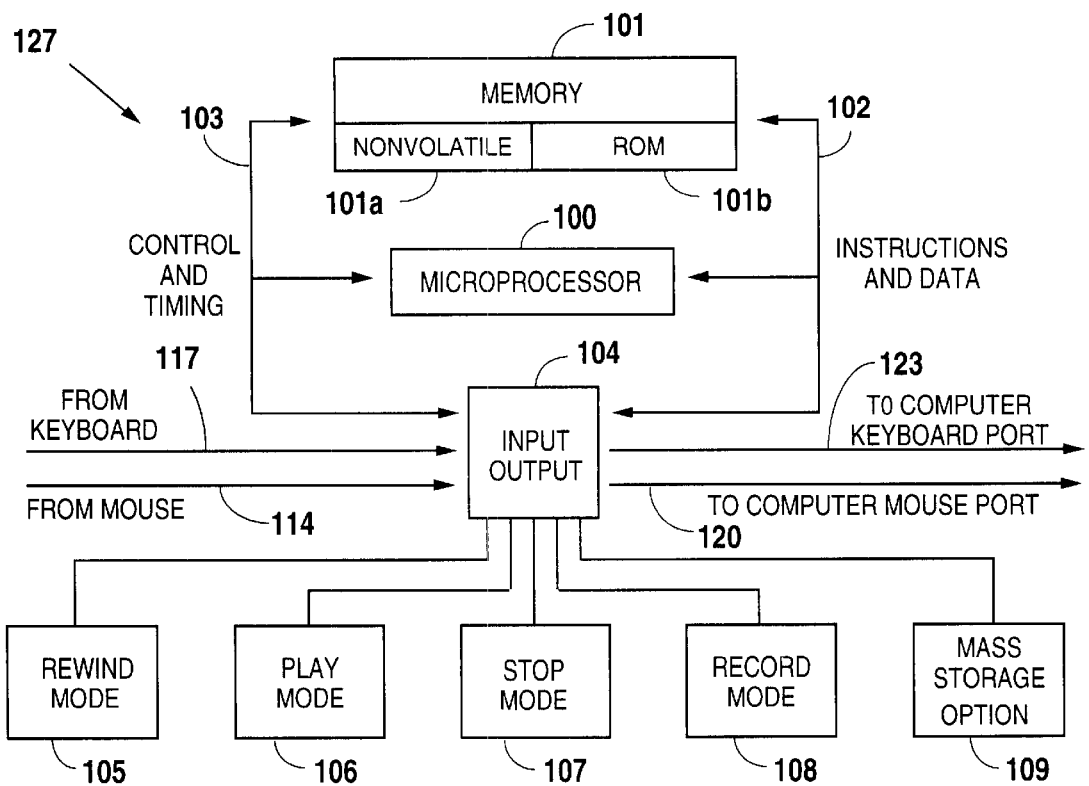
FIG. 3 is a electronic block diagram of the preferred embodiment of the invention.

FIG. 3 is an electronic block diagram of the preferred embodiment of the invention. There are many different ways of constructing the MCR 127 apparatus. The applicants herein describe one embodiment; but do not exclude other approaches that differ in detail, rather than in functionality. In record and stop mode mouse 113 (See FIG. 2) and keyboard 116 (See FIG. 2) signals travel to the MCR 127 unhampered through the mouse cable 114 and keyboard cable 117, respectively. These signals will flow through an input/output port(s) in 104 such as a parallel port of the MCR 127 and continue through to the mouse port 126 of the host computer system unit 111 via the second extension cable 120 (See FIG. 2) and to the keyboard port 125 via the first extension cable 123 (See FIG. 2).

The microprocessor 100 is used to control the operation of the MCR 127. The internal operating software system for the MCR 127 is contained in the memory 101. The mouse/keyboard data code information contained in each mouse and keyboard data transmission format is stored in the Nonvolatile memory 101a. A battery supply (not shown) may be used to provide power for certain memory chips to retain their stored data. The ROM memory 101b and Nonvolatile memory 101a make the operation of the MCR 127 totally independent of the software programs which may be resident in the host computer system unit 111. This makes the MCR 127 compatible with all host computer software.

Any or all of the microprocessor 100, interface chips 104, ROM memory 101a and Nonvolatile memory 101b can be combined into a single integrated circuit known as a microcontroller or integrated into a PC 104 board (a self contained PC computer on a board). The microprocessor 100 will manage the control and timing functions 103 of the MCR 127 as well as the storage and transmission of the data 102 and running of the internal programs. The Rewind Mode 105, Play Mode 106, Stop Mode 107, Record Mode 108, and Mass Storage Option 109 of the MCR 127 are illustrated.

Figure 4:
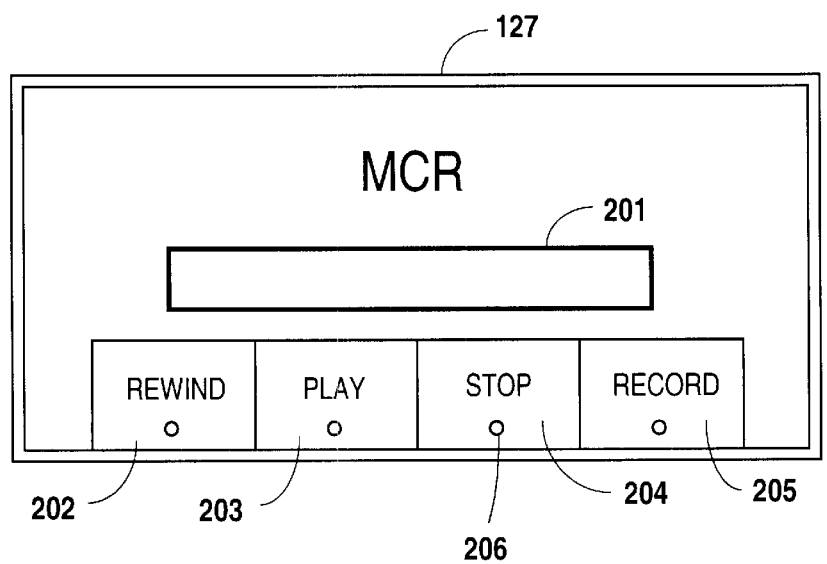
FIG. 4 is a top view of the MCR's user controls.

FIG. 4 illustrates the invention's user controls. The controls to the MCR 127 are designed to have functionality similar to a VCR tape recorder so that the user will be familiar with the controls as well as the concepts behind the controls. After installing the MCR 127 as illustrated in FIG. 2, the user has the option of positioning the mouse 113 (See FIG. 2) pointer at a specific video display 112 (See FIG. 2) location before recording the mouse 113 (See FIG. 2) actions and keyboard 116 (See FIG. 2) keystrokes. The upper left hand corner of the video display 112 (see FIG. 2) is easy to find and provides a good reference point to begin any mouse 113 (See FIG. 2) movements. If the user has just turned on the host computer system unit 111 (See FIG. 2), many computer applications will automatically position the mouse 113 (See FIG. 2) cursor in the center of the video display 112 (See FIG. 2) which also can be a starting point for a particular MCR 127 recording.

After the host computer system unit 111 (See FIG. 2) is turned on, the user can begin recording at any time by pressing the record button 205 on the MCR 127 control panel. Indicator lights 206 can be used to indicate that a particular mode is in operation. For example, when the play button 203 is depressed, a blinking red LED light would indicate that the user was in play mode 106 (See FIG. 3). Alternatively, toggle buttons can also be used instead of the indicator lights 206. Optionally, a display panel 201 could be installed to indicate the different controller modes (REWIND 202, PLAY 203, STOP 204, RECORD 205). The display panel 201 could also be used to indicate to the user the current time position of the recording relative to the total recorded time, somewhat like a scroll bar indicator.

Figure 5:
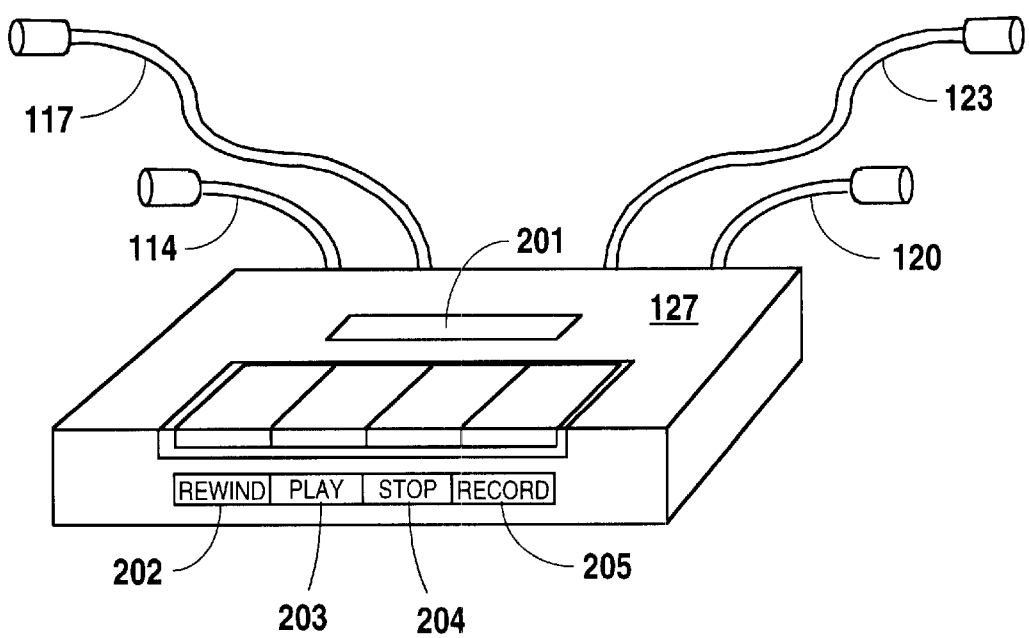
FIG. 5 is a perspective view of the MCR apparatus.

FIG. 5 shows a 3-dimensional view of the MCR 127. The keyboard cable 117 and the mouse cable 114 are shown entering the MCR 127. In addition, the first extension cable 123 and the second extension cable 120 are shown exiting the MCR 127. The first extension cable 123 will connect to the keyboard port 125 (See FIG. 2) by way of the first connector 124 (See FIG. 2). The second extension cable 120 will connect to the mouse port 126 (See FIG. 2) via the second connector 121 (See FIG. 2). The rewind button 202, play button 203, stop button 204, record button 205, and display panel 201 of the MCR 127 shown can be mounted directly into a keyboard device with mouse capabilities.

To get into record mode 108 (See FIG. 3), the user must press the record button 205 and play buttons 203 simultaneously to prevent accidental pressing of the record button 205. In another embodiment a sliding plastic cap (not shown) could be placed over the record button 205 to prevent accidental pressing of the record button 205.

Figure 6A:
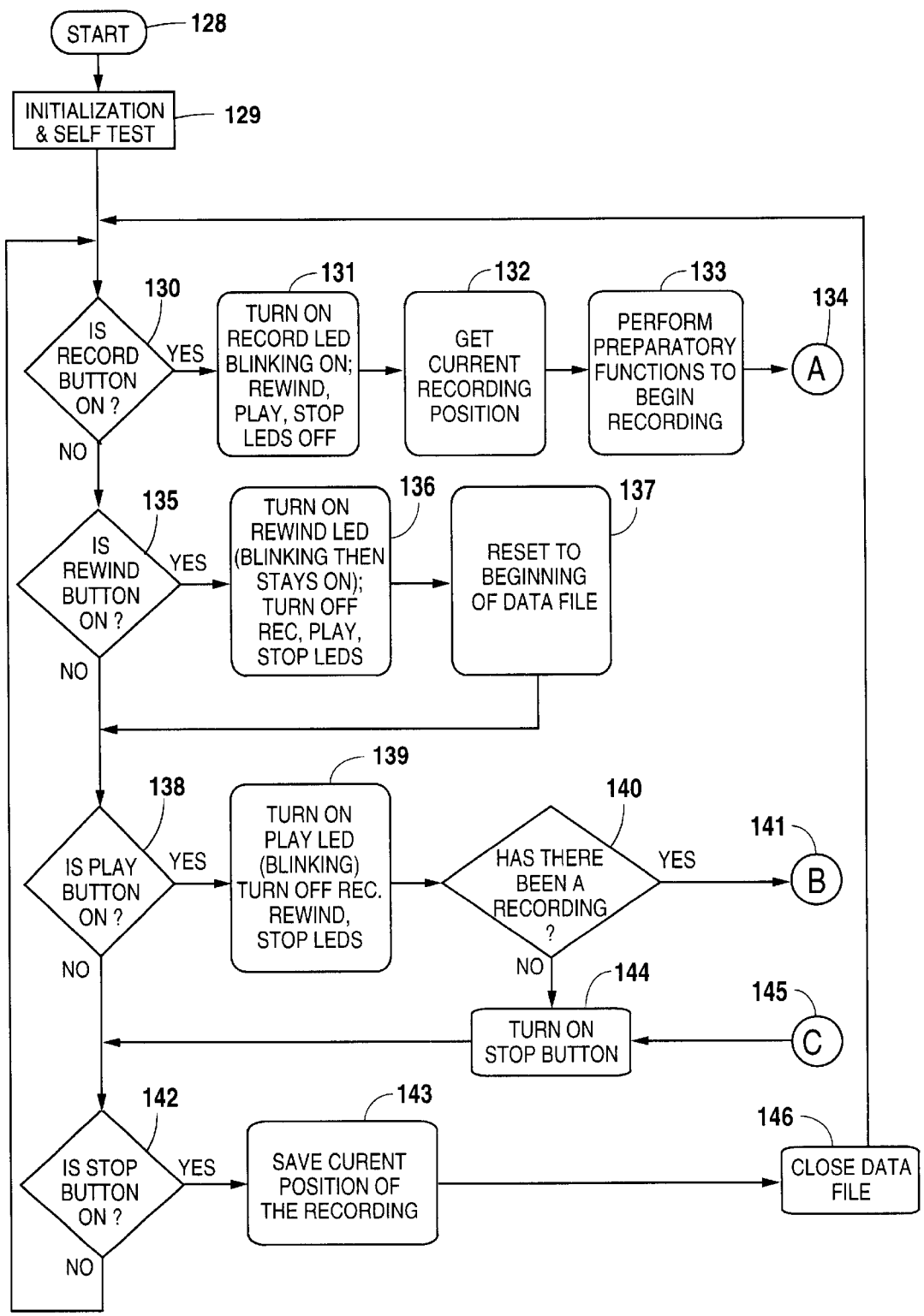
FIG. 6a is a flowchart of the MCR with the principle operations of RECORD, REWIND, PLAY, and STOP.

FIGS. 6(a,b,c) is a flowchart of the MCR 127 with the principle operations of RECORD, REWIND, PLAY, and STOP. FIG. 6a shows the four primary operations. Once the MCR 127 (See FIG. 2) is started at 128 and the initialization and self test at 129 is complete, a path at 130 will determine whether the record button 205 (See FIG. 4) is on. If the record button 205 (See FIG. 4) is on, a routine will occur to turn on the record LED and turn the other LED's off at 131, get the current recording position at 132, perform preparatory functions to begin recording at 133, and then record at 134. If the record button 205 (See FIG. 4) is not on but the rewind button 202 (See FIG. 4) is on at 135, the requisite LED will display at 136 and the MCR 127 (See FIG. 2) will be reset to the beginning of the data file at 137. If neither the record button 205 (See FIG. 4) nor the rewind button 202 (See FIG. 4) is on at 138, but the play button 203 (See FIG. 4) is on, the play LED will be displayed at 139 and the MCR 127 (See FIG. 2) will determine if there has been a recording at 140. If there has been a recording, then the MCR 127 (See FIG. 2) will play, if there has not been a recording, then the MCR 127 (See FIG. 2) will continue on to 142 by way of the stop button sequence at 144. If the stop button 204 (See FIG. 4) is on at 142, then the MCR 127 (See FIG. 2) will save the current position of the recording at 143 and close the data file at 146.

Figure 6B:
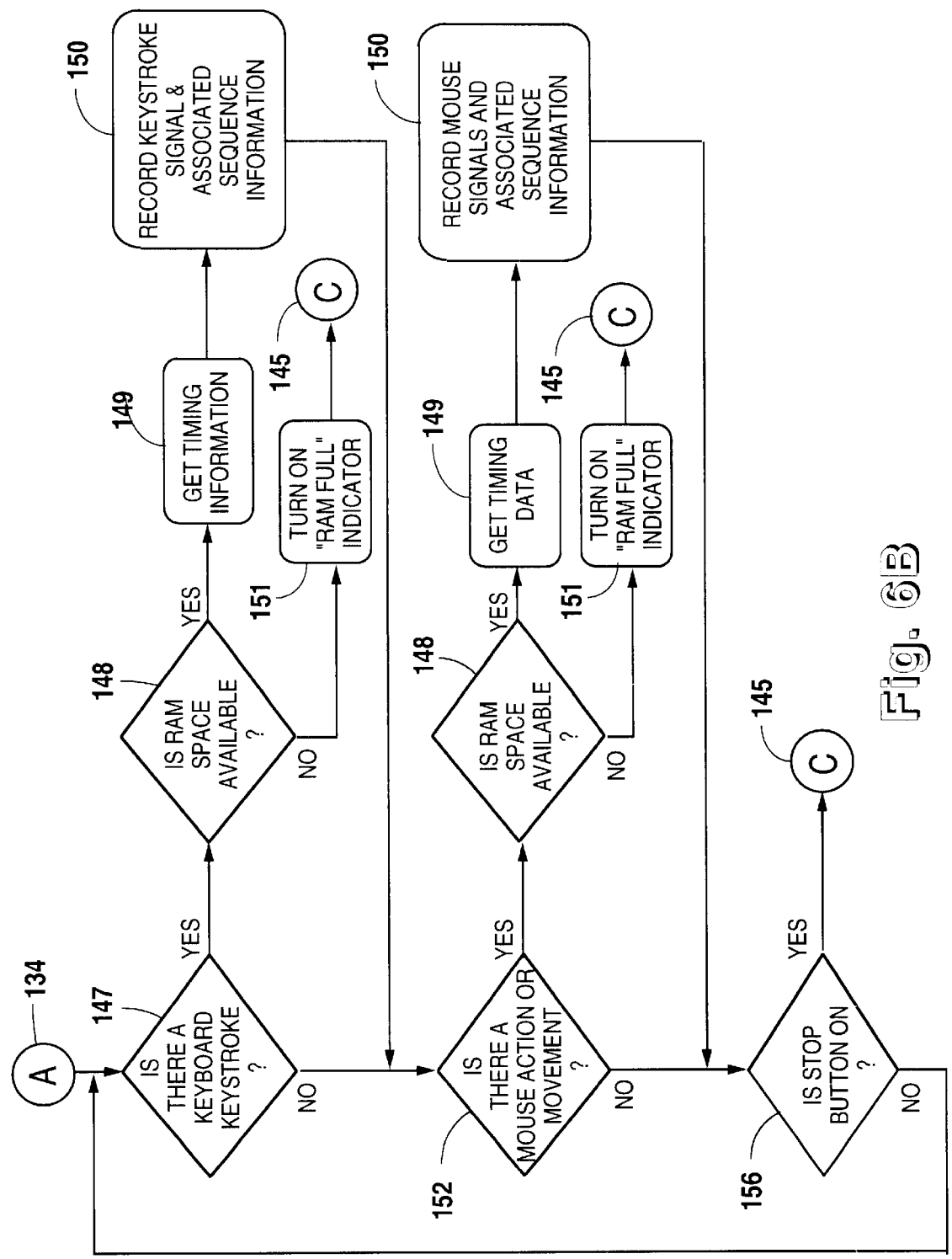
FIG. 6b is a flowchart of the MCR's RECORD operation.

FIG. 6b shows the major features in the recording of keyboard 116 (See FIG. 2) keystrokes at 147 and mouse 113 (See FIG. 2) actions or movements at 152 in record mode 108 (See FIG. 3). The check for RAM space at 148 in the next step ensures that there is enough memory storage available to save the keyboard/mouse actions. If the RAM space is full, an indicator light (LED) at 151 is turned on to inform the user that there is insufficient RAM to continue recording and the STOP button 204 (See FIG. 4) is turned on at 144 via 145. In other variations of the MCR 127 (See FIG. 2), the keystrokes and/or mouse actions may be saved onto other storage media such as hard disk or magnetic tape at 150. Another important feature is obtaining the timing information at 149 associated with each keystroke or mouse action. This will be used to properly synchronize the playback. If there are no keystrokes and/or mouse actions, the MCR 127 (See FIG. 2) will determine if the stop button is on at 156 and if so stop the system at 144 via 145.

Figure 6C:
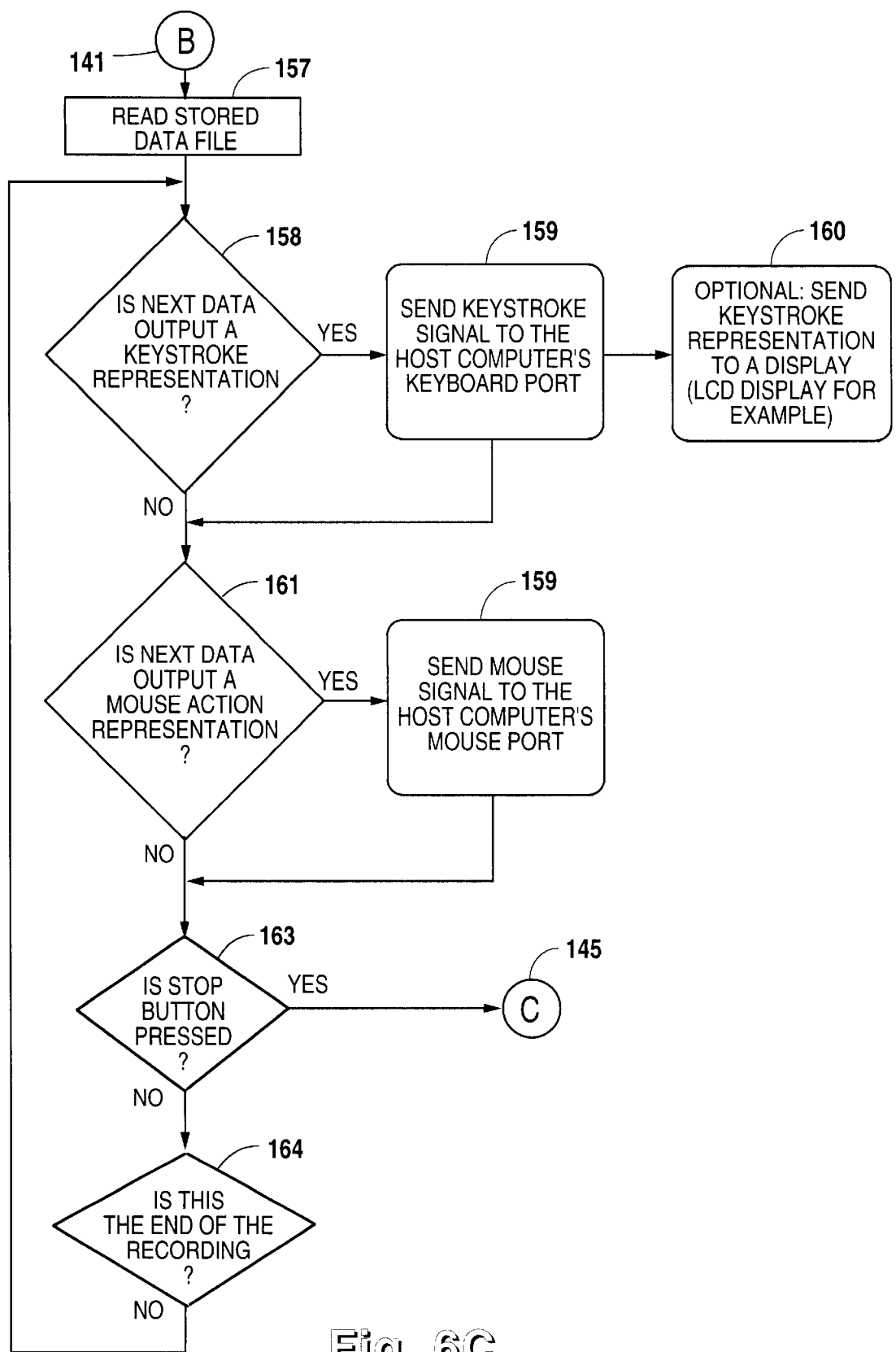
FIG. 6c is a flowchart of the MCR's PLAY operation.

FIG. 6c is a flowchart of the PLAY mode portion of the MCR 127 (See FIG. 2). In the PLAY mode, the stored data is read at 157 and deciphered as to whether it is a keyboard 116 (See FIG. 2) keystroke or mouse 113 (See FIG. 2) action at 158 and 161, respectively. The data is then processed and the appropriate signal is sent to host computer system unit 111 at 159. In other variations of the MCR 127 (See FIG. 2), there could be a display in which the keystrokes can be viewed by the user in realtime at 160.

To indicate that the MCR 127 (See FIG. 2) is in record mode 108 (See FIG. 3), the device could have an optional flashing LED indicator light 206 (See FIG. 4) near or on the record button. In another variation to indicate that the MCR 127 (See FIG. 2) is in record mode 108 (See FIG. 3), the device could have a LCD display readout on a display panel 201 (See FIG. 4) with "RECORDING". When the memory is full, a "memory full" display might show on the display panel 201 (See FIG. 4) or a special flashing light indicator.

The concept is that the host computer system unit 111 (See FIG. 2) (IBM PC compatible, Macintosh, Sun Workstation, Silicon Graphics Inc Workstation, etc) would not be able to distinguish whether the received sequence of mouse/keyboard data 102 (See FIG. 3) code pulses is being generated by the mouse 113 (See FIG. 2), keyboard 116 (See FIG. 2), or the MCR 127 (See FIG. 2). This makes the MCR 127 (See FIG. 2) transparent to the hardware as well as the software of the host computer system unit 111 (See FIG. 2) being used. Since the memory means of the MCR 127 (See FIG. 2) is non-volatile memory 101a (See FIG. 3), the recorded and stored mouse 113 (See FIG. 2) keyboard 116 (See FIG. 2) actions or acquired data 102 (See FIG. 3) are available to the user to play on the host computer system unit 111 (See FIG. 2) at any time in the future. Also, the host computer system unit 111 (See FIG. 2) can be turned off without affecting the recorded mouse/keyboard data 102 (See FIG. 3). The MCR 127 (See FIG. 2) can be disconnected from the host computer system unit 111 (See FIG. 2) and reconnected at a future date to the same or another similar host computer system unit 111 (See FIG. 2) without affecting the recorded mouse/keyboard data 102 (See FIG. 3). It would be the user's responsibility to ensure that the icons and menus on any of the host computer system units 111 (See FIG. 2) be in the proper positions. In general, most users will setup a desktop with application icons and will have little need to constantly change the icon locations on the video display 112 (See FIG. 2). The user can record over the current recording at any time by pressing the REWIND button 202 (See FIG. 5) and then the RECORD button 205 (See FIG. 5) on the MCR 127 (See FIG. 2) control panel. Alternatively, the MCR 127 (See FIG. 2) can be designed to be in record mode 108 (See FIG. 3) only after pressing the RECORD button 205 (See FIG. 5) and PLAY button 203 (See FIG. 5) at the same time to prevent accidental recordings. To stop recording, the user would press the STOP button 204 (See FIG. 5). Multiple record/play buttons can be included to perform multiple tasks i.e. have a multiple record/play channel within one MCR.

To start playing at the beginning of the recording, the user would press the REWIND button 202 (See FIG. 5) and then the PLAY button 203 (See FIG. 5) to start playing the mouse/keyboard actions at the beginning of the stored data. In normal speed, the MCR 127 (See FIG. 2) will play back the recorded data in exactly the same chronological order with the same time pauses between data sequences so that certain mouse/keyboard actions are not lost during the launching of a computer application. But there are occasions in which the user may want to discard dead time on the MCR 127 (See FIG. 2) especially for monitoring purposes. There could be optional software algorithms that could effectively fast forward through certain portions of the data without losing the continuity of the computer application. Again the analogy is similar to a VCR tape recording with a magnetic tape media. Instead of a tape media, stored data on memory chips would be used. These actions may be stored on a mass storage device such as a hard disk drive, floppy disk, optical disk, tape, or zip-type cartridge. Optionally, the data can be stored in a mass storage device, read into an editor, altered or modified, uploaded into the MCR 127 (See FIG. 2) memory and then replayed. Interchangeable memory modules such as those used for game cartridges can be inserted into a modified MCR to run specialized recordings for specific machines.

It is also possible to process the stored data file at 157 and extract a scripted form in which the user's keystrokes and mouse actions can be readable to humans. This is especially useful for security monitoring and computer trail auditing in case of computer error or computer failure. Another enhancement includes recording the user's keystrokes and mouse actions as pre-recorded scripts converting the MCR data into an editable form such as an ASCII file which can be modifiable and then reconverted to MCR data file format for loading back into the MCR 127 (See FIG. 2), and played via the MCR 127 (See FIG. 2).

The embodiment of the MCR 127 (See FIG. 2) described herein is designed to record all mouse/keyboard codes or signals. Thus, the MCR 127 (See FIG. 2) can be used within a FAMILY of computer systems that have different mouse/keyboard coding schemes. The MCR 127 (See FIG. 2) operates without direct support from the hardware of the host computer system units 111 (See FIG. 2) and mouse 113 (See FIG. 2) and keyboard 116 (See FIG. 2), independently of the software of the host computer system unit 111 (See FIG. 2), and independently of the mouse/keyboard code convention of the host computer system unit 111 (See FIG. 2). The MCR 127 (See FIG. 2) is thus transportable between a plurality of computers in the same FAMILY. The internal operating system of the MCR 127 (See FIG. 2) is reprogrammable in order to accommodate other mouse/keyboard codes. In addition, the MCR 127 (See FIG. 2) can be capable of retaining the stored keyboard and mouse actions even when it is unplugged from the host computer system unit 111 (See FIG. 2).

Another variation of the invention would be to save a scripted set of mouse/keyboard actions and commands in a form to be transferred to another MCR device for playback. The idea would be analogous to a VCR tape device which can record programs and be played back in another VCR unit. The stored media can be any of the multitude of storage media available such as cassette tape, floppy diskette, zip cartridges or the like, DAT tapes or similar magnetic tape media, mini-zip cartridges, or the like. The MCR can have an external hookup to a media device to store a script of mouse/keyboard actions which may be converted into a form in which a user may be able to read and understand a user's action and in which a user may be able to modify and store the revised script for later playback. This would be akin to editing a VCR tape for later playback. A scripted version which is understandable by a user is especially useful when an employer has a need to monitor its employee's actions for security reasons, for troubleshooting computer problems, or for accurate record keeping.

A different adaptation of the MCR can have mass storage devices such that if all computers are similarly configured, it is possible to use the same stored data sequences generically by downloading the MCR data into multiple MCR apparatuses and playing the data.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A mouse/keyboard recorder apparatus comprising:
   a hollow body incorporating operating software for recording electronic signals from keystrokes on a keyboard or actions with a mouse which are operatively software and hardware independent, wherein said hollow body is associated with a host computer unit, but is operatively software and hardware independent therefrom; said hollow body comprising a recorder mode for recording said electronic signals from said keystrokes or said actions associated with a record button on said hollow body, a stop mode for stopping said recording of said electronic signals from said keystrokes or said actions or for stopping of playing of recorded electronic signals from said keystrokes or said actions associated with a stop button on said hollow body, a rewind mode for rewinding said recording of said electronic signals from said keystrokes or said actions associated with a rewind button on said hollow body, and a play mode for playing said recording of said electronic signals from said keystrokes or actions associated with a play button on said hollow body;
   an interface located at the input region and output region of said hollow body for allowing electronic signals to flow from said keyboard or said mouse to said host computer unit when said hollow body is associated with said host computer, said keyboard and said mouse, wherein said input region of said hollow body is connected to said keyboard or said mouse via cables for transmission of said electronic signals from said keystrokes or said actions and said output region of said hollow body is connected to said host computer unit via cables for transmission of said electronic signals from said hollow body to said host computer unit;
   a data processor for storing said electronic signals located within said hollow body;
   a nonvolatile memory within said data processor for storing electronic signals as stored data when external power is removed; and
   memory within said data processor for storing said operating software;
   whereby when said hollow body is associated with said host computer said hollow body will record keystrokes and actions without the awareness of the host computer user.

2. A method of recording keystrokes on a keyboard or actions with a mouse comprising the steps of:
   powering on the mouse recorder apparatus of claim 1;
   powering on a host computer unit;
   pushing the record button on said mouse/keyboard recorder apparatus for recording electronic signals of said keystrokes or said actions;
   typing said keystrokes on said keyboard or relaying said actions with said mouse;
   relaying said keystrokes or said actions to said mouse/keyboard recorde apparatus in a clandestine manner independent from said host computer unit hardware or software;
   recording said keystrokes or said actions with said mouse/keyboard recorder apparatus;
   obtaining timing information from said electronic signals for synchronizing playback of said keystrokes or said actions;
   storing said keystrokes or said actions within said mouse/keyboard recorder apparatus;
   terminating said typing of said keystrokes or relaying said actions; and
   stopping said mouse keyboard recorder apparatus.

3. The method of claim 2 further comprising the step of determining whether there is sufficient random access memory available in said mouse/keyboard recorder apparatus for storing said keystrokes or said actions.

4. The method of claim 3 wherein said record step further comprises second recording of sequence information of said keystrokes or said actions.

* * * * *